(12) United States Patent
Tsai et al.

(10) Patent No.: US 10,499,225 B2
(45) Date of Patent: Dec. 3, 2019

(54) SYSTEM AND METHOD FOR ADJUSTING VARIABLE(S) RELATED TO NEAR FIELD COMMUNICATIONS ANTENNA FOR MOBILE DEVICES TO ENSURE ANTENNA OPERATION WITHIN A DEFINED OPERATING RANGE

(71) Applicant: BBPOS LIMITED, Tsuen Wan (HK)

(72) Inventors: Hwai Sian Tsai, Hong Kong (HK); Peter Choi, Tsuen Wan (HK); Chi Wah Lo, Hong Kong (HK)

(73) Assignee: BBPOS LIMITED, Tsuen Wan (HK)

( * ) Notice: Subject to any disclaimer, the term of this patent is extended or adjusted under 35 U.S.C. 154(b) by 0 days.

(21) Appl. No.: 14/540,746

(22) Filed: Nov. 13, 2014

(65) Prior Publication Data

US 2016/0142107 A1    May 19, 2016

(51) Int. Cl.
*H04W 4/80* (2018.01)
*H04B 5/00* (2006.01)

(52) U.S. Cl.
CPC ............ *H04W 4/80* (2018.02); *H04B 5/0031* (2013.01); *H04B 5/0087* (2013.01)

(58) Field of Classification Search
None
See application file for complete search history.

(56) References Cited

U.S. PATENT DOCUMENTS

| | | | | |
|---|---|---|---|---|
| 2009/0102419 A1* | 4/2009 | Gwon | ............... | H02J 7/025 320/108 |
| 2012/0139358 A1* | 6/2012 | Teggatz | ............... | H01F 38/14 307/104 |
| 2012/0299390 A1* | 11/2012 | Kim | ............... | B60L 11/182 307/104 |
| 2013/0175874 A1* | 7/2013 | Lou | ............... | H04B 5/0093 307/104 |
| 2015/0180552 A1* | 6/2015 | Konanur | ............... | H01Q 7/005 455/41.1 |
| 2015/0372395 A1* | 12/2015 | Lavedas | ............... | H01Q 21/28 343/748 |
| 2016/0103191 A1* | 4/2016 | Von Novak, III | ..... | G01R 33/02 324/244 |

* cited by examiner

*Primary Examiner* — Alejandro Rivero

(57) ABSTRACT

A system for an antenna for near field communications (NFC), said antenna comprising a primary loop with a primary current to produce a magnetic field; one or more secondary loops with one or more secondary currents; wherein by adjusting one or more variables associated with said one or more secondary loops, said magnetic field is modified to ensure antenna operation within a defined operating range.

11 Claims, 5 Drawing Sheets

SYSTEM AND METHOD FOR ADJUSTING VARIABLE(S) RELATED TO NEAR FIELD COMMUNICATIONS ANTENNA FOR MOBILE DEVICES TO ENSURE ANTENNA OPERATION WITHIN A DEFINED OPERATING RANGE

TECHNICAL FIELD

The present disclosure relates to near field communications (NFC) antennas for mobile devices.

SUMMARY

A system for an antenna for near field communications (NFC), said antenna comprising a primary loop with a primary current to produce a magnetic field; one or more secondary loops with one or more secondary currents; wherein by adjusting one or more variables associated with said one or more secondary loops, said magnetic field is modified to ensure antenna operation within a defined operating range; and said one or more variables comprise a number of secondary loops, one or more amplitudes of the one or more secondary currents in the one or more secondary loops, one or more phase differences between the one or more secondary currents in the one or more secondary loops and the primary current in the primary loop, one or more shapes of the one or more secondary loops; one or more dimensions of the one or more secondary loops, and one or more placements of the one or more secondary loops.

A method for an antenna for near field communications (NFC), said antenna comprising a primary loop with a primary current to produce a magnetic field; one or more secondary loops with one or more secondary currents; wherein said method comprises modifying said magnetic field to ensure antenna operation within a defined operating range; said modifying comprising adjusting one or more variables associated with said one or more secondary loops, wherein said one or more variables comprise a number of secondary loops, one or more amplitudes of the one or more secondary currents in the one or more secondary loops, one or more phase differences between the one or more secondary currents in the one or more secondary loops and the primary current in the primary loop, one or more shapes of the one or more secondary loops; one or more dimensions of the one or more secondary loops, and one or more placements of the one or more secondary loops.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
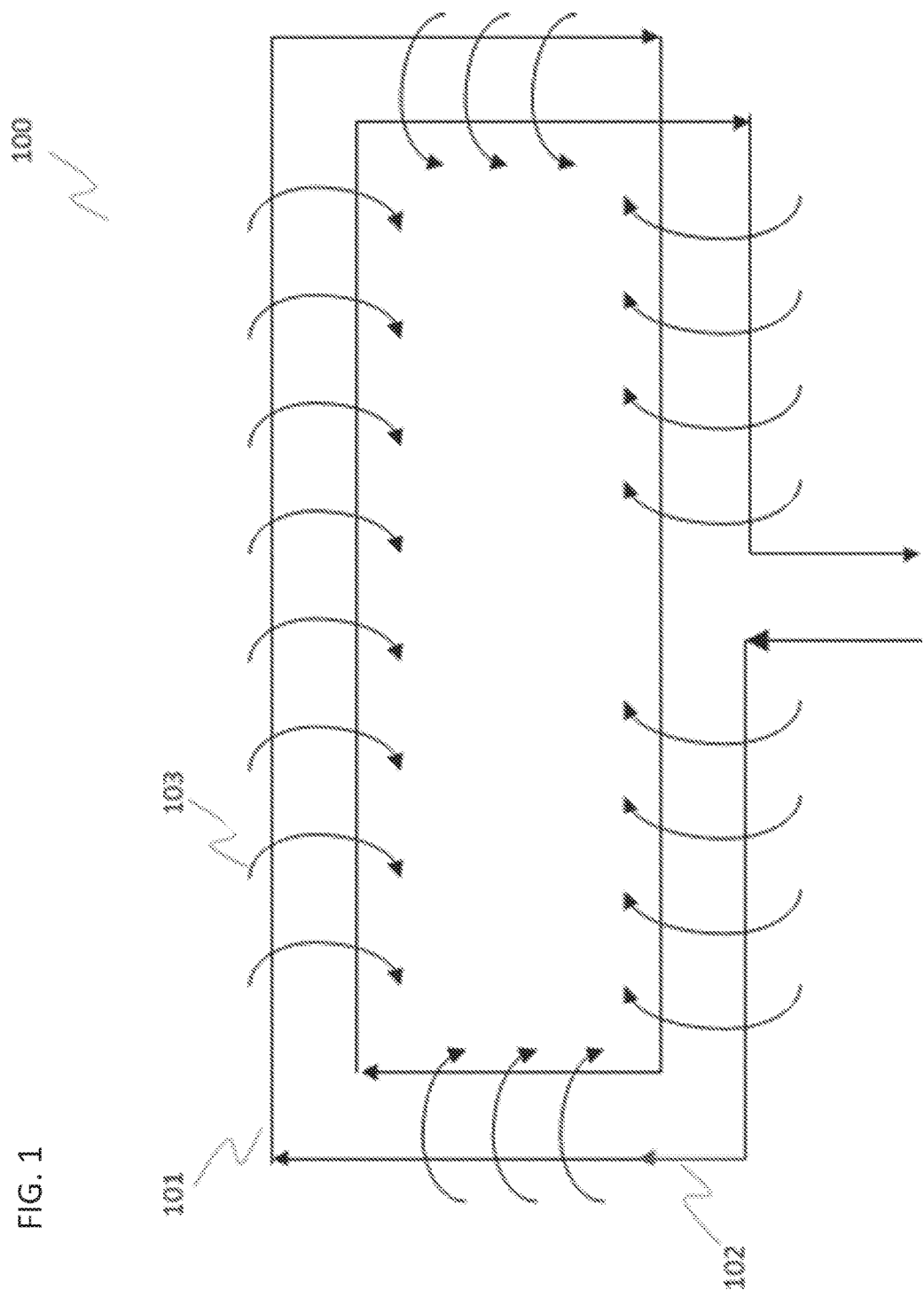
FIG. 1 shows a NFC antenna 100 with primary loop 101 and primary current 102 and magnetic field 103.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Referring now to the drawings, wherein like reference numbers are used herein to designate like elements throughout, the various views and embodiments of system and method for near field communications antenna for mobile devices are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Near field communications (NFC) antennas are used in many mobile devices such as smartphones, tablets, laptops, and wearable devices. These devices operate via proximity coupling of magnetic fields. These include, for example, Europay, MasterCard and Visa (EMV) contactless communications, sharing files between electronic devices, reading of "tags", and gaming. Various regulatory and standardization bodies have published performance requirements for the devices which utilize these NFC antennas.

Typically, many of these performance requirements stipulate that these antennas operate within a magnetic field strength range comprising a minimum and maximum magnetic field strength, over a specific operating volume. A typical design challenge is then to ensure that an NFC antenna is able to operate within this range. This is a difficult challenge due to the following factors. Due to space constraints, the NFC antennas are restricted to certain shapes and aspect ratios. This makes it difficult to generate specific three-dimensional (3D) operating shapes. For example, in some smartphones the NFC antennas are typically planar loops. The magnetic field pattern is modified by materials close to the NFC antenna. For example, a material with high permeability will amplify the magnetic field strength. Furthermore, certain materials which obstruct electromagnetic fields will reduce the magnetic field strength in a certain area.

While the prior art describes beam steering and beam forming solutions to face such challenges, most of this prior art is typically targeted to far-field applications rather than near-field design. This means that many of these solutions are not applicable to NFC antennas.

Also, many NFC antennas have dimensions which are orders of magnitude smaller than the operating wavelength. For example, a typical operating frequency for an NFC antenna is 13.56 MHz, implying that the wavelength is around 22 m. However the typical dimensions of a rectangular loop antenna are around 2-3 inches×1-2 inches (around 5-8 cm×2.5-5 cm). This means that the wavelength is orders of magnitude larger than the antenna. It is well known to those of skill in the art that such antennas have very poor radiation efficiency. This stands in contrast to antennas designed for far field applications which typically have very high radiation efficiency.

Therefore there is a need for a solution to ensure that a proximity coupling NFC antenna operates within a certain range and produces a certain operating volume. A system and method to provide such a solution is described below in the remainder of this specification.

In one embodiment, the NFC antenna comprises a primary loop. Referring to FIG. 1, NFC antenna 100 comprises primary loop 101. By sending a sinusoidally varying primary current 102 at a specified operating frequency through this primary loop, a magnetic field 103 is generated within a specific operating volume as shown in FIG. 1. In one embodiment, the operating frequency is set to 13.56 MHz. The principles of operation of such an NFC antenna are well known to those of skill in the art and thus will not be discussed further here.

Typically, with such structures, problems may arise. For example, the magnetic field strength may be too high in the center of the loop.

Figure 2:
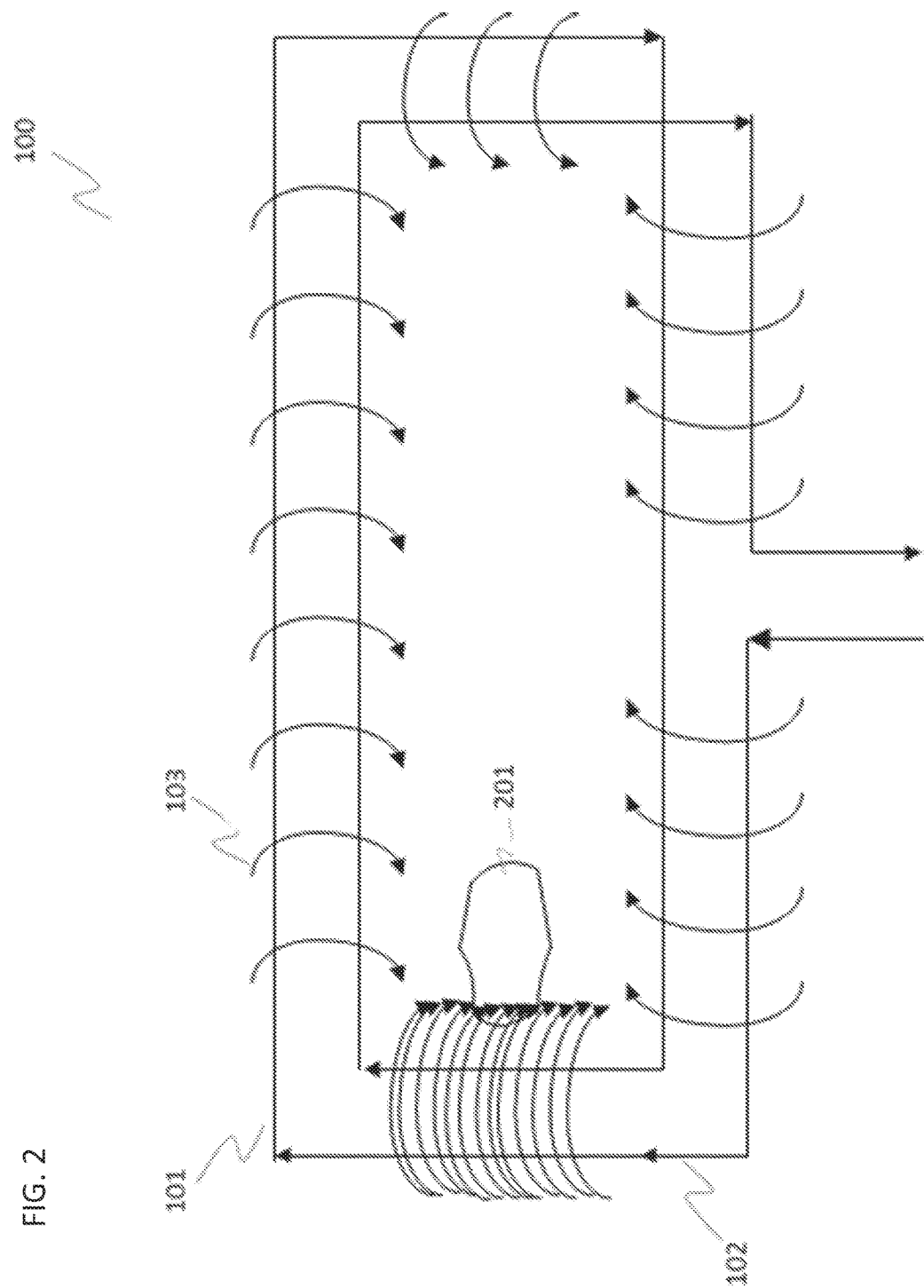
FIG. 2 shows a NFC antenna 100 with magnetic field 103 enhanced by element 201.

Another problem which could potentially arise is when an element with a material that either enhances or suppresses the magnetic field is placed close to the primary loop. An example is shown in FIG. 2, where element 201 which enhances the magnetic field is placed close to the primary loop. This has the effect of imbalancing magnetic field 103. Then, the strength of magnetic field 103 is not within the operating range in the operating volume, or the operating volume is modified. That is, either the magnetic field strength is too high or too low, or the operating volume becomes anti-symmetric leading to inconsistent performance of the system.

A further problem which could potentially arise is difficulty in meeting the shape requirement of the specific operating volume using only a primary loop. For example, it is not easy to realize a cylindrical operating volume using a rectangular primary loop.

These problems as outlined above, can be overcome by using one or more secondary loops with one or more sinusoidally varying secondary currents in the antenna. These secondary currents will have the same operating frequency as the primary current in the primary loop. By adjusting one or more variables such as: the number of secondary loops; the amplitude of the one or more secondary currents in the one or more secondary loops; the phase difference between the one or more secondary currents in the one or more secondary loops and the primary current in the primary loop; the shape of the one or more secondary loops; the dimensions of the one or more secondary loops; and the placement(s) of the one or more secondary loops. It is then possible to modify the magnetic field, to ensure that the antenna operates within the defined operating range within an operating volume.

Figure 3:
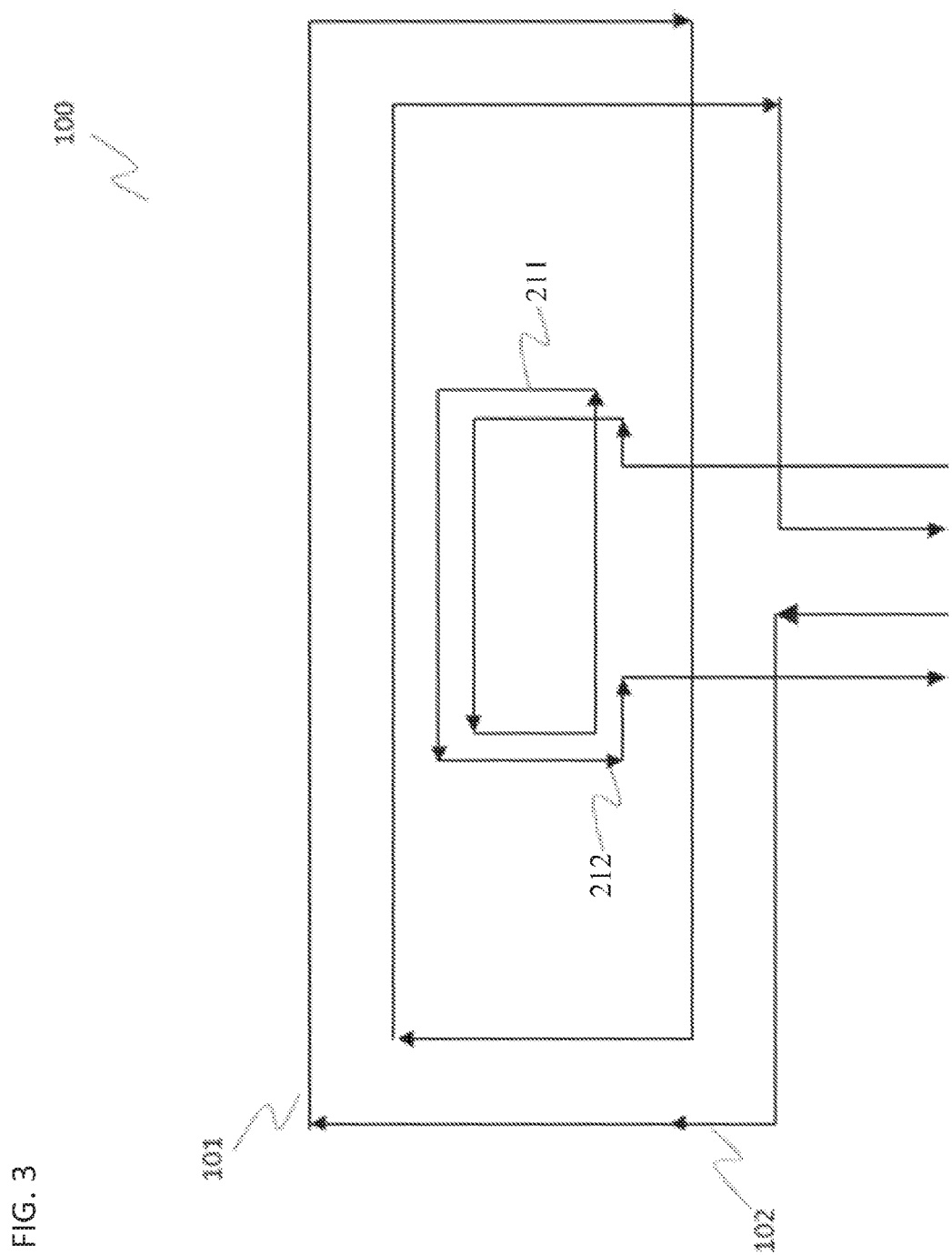
FIG. 3 shows a NFC antenna 100 with secondary loop 211 and secondary current 212 to reduce the magnetic field strength in the centre of primary loop 101.

For example, with reference to the problem of excessively high magnetic field strength in the center, by placing a secondary loop with a secondary current that is out of phase with the primary current in the primary loop, as shown in FIG. 3, it is possible to reduce the magnetic field strength in the center such that the antenna operates within the operating range. While only one secondary loop is shown in FIG. 3, it would be known to one of skill in the art that one or more secondary loops could be used.

The settings for the variables mentioned above can be obtained using a variety of techniques. In one embodiment, the settings for the variables are obtained using numerical simulation. In another embodiment, the settings for the variables are obtained using analytical techniques and approximations known to those of skill in the art. In a further embodiment, the settings for the variables are obtained via testing and continuous adjustment. In other embodiments, said settings are obtained using a combination of said techniques.

Figure 4:
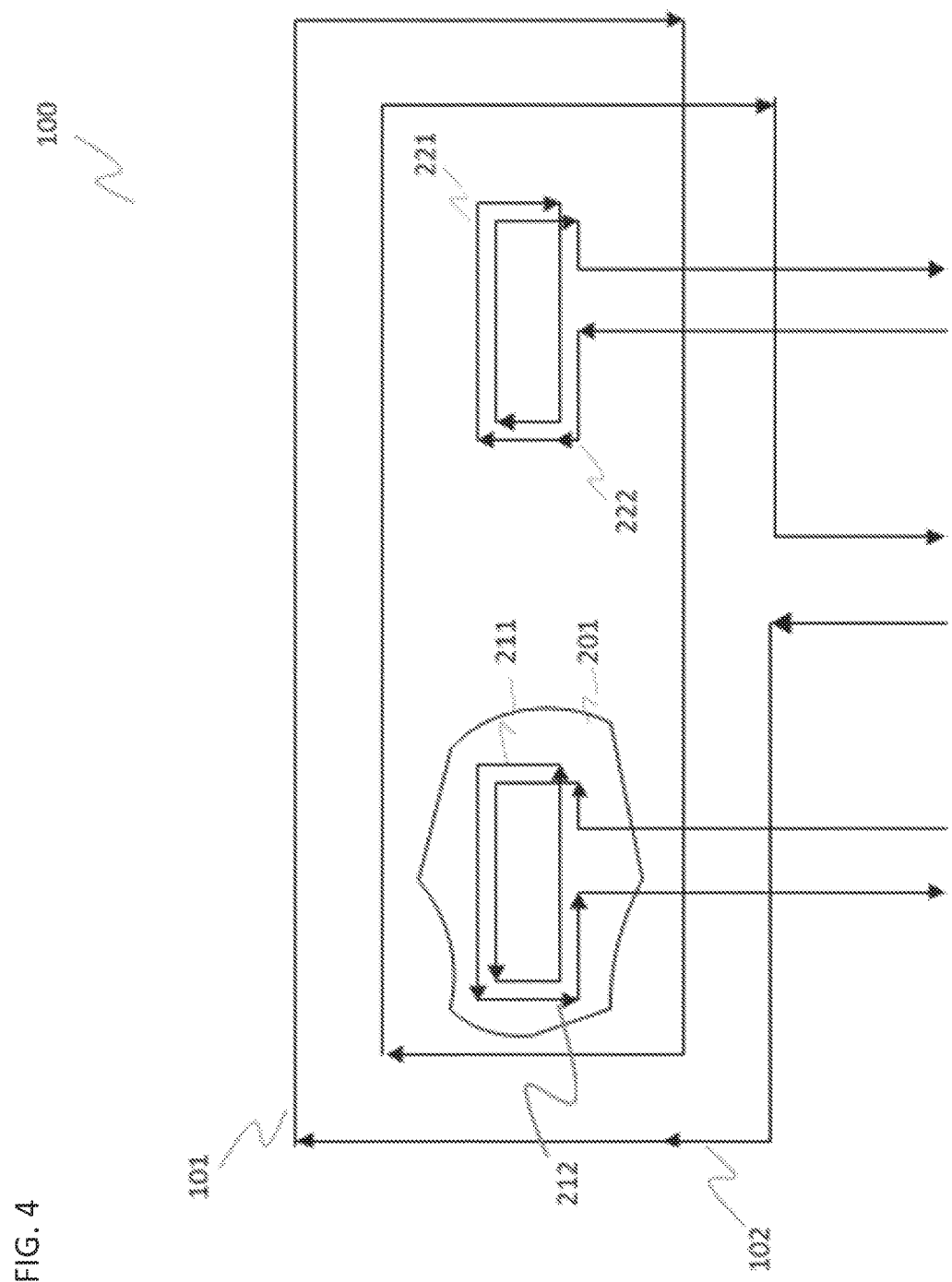
FIG. 4 shows a NFC antenna 100 with secondary loops 211 and 221, running secondary currents 212 and 222, to reduce the enhancement caused by element 201 and balance the magnetic field.

Similarly, the problem shown in FIG. 2 can be addressed by using one or more secondary loops close to the material which enhances or suppresses the magnetic field, as is shown in FIG. 4. In FIG. 4, secondary loop 211 carrying secondary current 212 is placed so as to suppress the increased magnetic field due to element 201. As explained previously, variables such as amplitude and phase difference of the one or more secondary currents, and aspect ratio and placement of the one or more secondary loops, are adjusted so as to obtain the required field strength. In a further embodiment, so as to improve the symmetry of the field distribution throughout the operating volume, one or more secondary loops are placed away from the material such as secondary loop 221 carrying secondary current 222. Then, the variables discussed previously are adjusted.

Finally, by using one or more secondary loops with one or more currents such as secondary loop 221 with secondary current 222, and secondary loop 211 with secondary current 212; the operating volume can be appropriately shaped and extended. For example, as was explained previously, the magnetic field due to the primary loop 103 tends to be stronger in the center. In conjunction with suppressing the magnetic field in the center as discussed above and shown in FIG. 3, one or more loops similar to secondary loop 221 carrying secondary currents of varying amplitude and phase difference can be used to shape the operating volume by, for example, changing the symmetry or extending the operating volume. These loops may also be differently shaped depending on the requirements for the operating volume.

It would be obvious to one having skill in the art that while rectangular loops are demonstrated above, the techniques outlined here can be extended to non-rectangular shapes, including, for example, circles, ellipses or other shapes.

While at the design phase a designer has control of all of the variables, once the NFC antenna is built and used within an operating mobile device, only some of the variables can be adjusted within the secondary loops, such as the amplitudes and phase differences of the secondary currents. So, for example, as the mobile device operating characteristics change over time, this may require that the amplitudes and phase differences also be altered so as to ensure that the NFC antenna continues to operate within the performance requirements.

Furthermore, it is likely that different mobile devices will have different designs and therefore modify the magnetic field produced by the primary loop in the NFC antenna in different ways. Thus the adjustments for different mobile devices may differ from one another. It would be cost-inefficient, given the requirements of a typical supply chain for a mobile device manufacturer, to find a combination by optimizing all of the variables for each mobile device.

To meet these further challenges, in one embodiment, the physical configuration of the primary and secondary loops, that is, the shape, dimensions, number of secondary loops, and placement of the secondary loops is kept the same for each mobile device. However, the amplitudes and phase differences of the secondary currents are adjusted for each different device so as to ensure that the NFC antenna operates within the performance requirements of the standards. For example, with reference to FIG. 4, secondary loop currents 212 and 222 are adjusted so as to meet the requirements of NFC antenna 100.

In another embodiment, for a given mobile device, the amplitudes and phase differences are dynamically adjusted over time so as to ensure that the NFC antenna continues to operate within the performance requirements. This allows for compensation as the operating characteristics of the mobile device change over time.

In one embodiment, this adjustment of the amplitudes and phase differences of the secondary currents are performed using various techniques. In one embodiment, the adjustment is based on measurements of the magnetic field distribution. For example, based on results obtained using known measurement solutions such as those provided by vendors such as Keysight®, the amplitudes and phase differences of secondary currents such as currents 212 and 222 are adjusted to ensure conformance with performance requirements. In another embodiment, adjustment is based on computer simulations. In a further embodiment, adjustment is based on a combination of simulation and measurement.

Various algorithms are used to adjust the secondary currents as well. In one embodiment, this involves using techniques such as learning algorithms, artificial neural networks, evolutionary algorithms, and tuning algorithms. In a further embodiment, historical data is used to perform the adjustment. In yet another embodiment, adjustment and tuning is performed using an "offline-online" dual stage method. In the on-line stage, measurements are continually captured in real-time while adjustments are made to ensure conformance. In the off-line stage, this captured measurement data is processed and used as inputs to, for example, machine learning algorithms to refine the adjustments to be used in the online stage. Therefore, over a period of time, it is likely that the adjustment process becomes more efficient.

Figure 5:
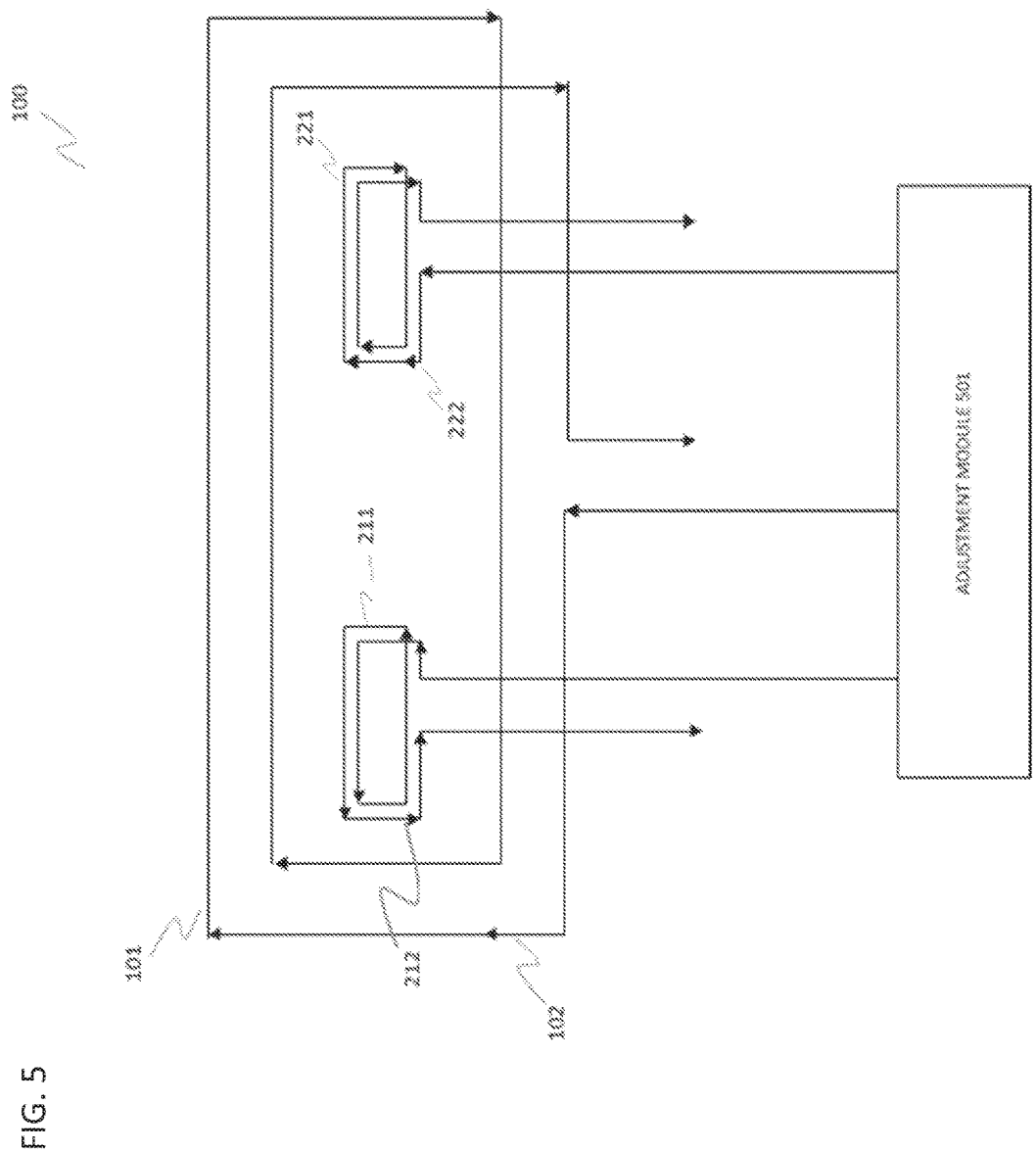
FIG. 5 shows an adjustment module 501.

In a further embodiment, the adjustments are performed using an adjustment module such as adjustment module 501 as shown in FIG. 5. In FIG. 5, adjustment module 501 controls the secondary currents 212 and 222, while reading primary current 102. Then the adjustment module 501 performs adjustments to secondary currents 212 and 222 using various techniques as outlined above. In a further embodiment, the adjustment module is implemented in software. In another embodiment, the adjustment module is implemented in hardware. In yet another embodiment, the adjustment module is implemented both in hardware and software. In the embodiments where the adjustment module is implemented in software, in one embodiment, the adjustments are performed using an application running on the mobile device containing the NFC antenna.

Although the algorithms described above have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions depicted herein can be implemented manually as opposed to automatically by a controller, processor, or similar computing device or machine. Further, although specific algorithms are described, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An antenna for near field communications (NFC), said antenna comprising:
   a primary loop with a primary current to produce a first magnetic field with an associated first magnetic field distribution within an operating volume of the antenna such that the first magnetic field distribution is stronger in a center of the primary loop relative to an edge of the primary loop;
   a secondary loop with a secondary current to produce a second magnetic field, said second magnetic field combining with said first magnetic field to produce an overall magnetic field with an associated overall magnetic field distribution within the operating volume of the antenna, said secondary loop disposed within the first magnetic field distribution in the center of said primary loop and oriented to allow said second magnetic field to suppress the first magnetic field in the center of the primary loop, and to enhance or suppress said overall magnetic field in the center of the primary loop, and to change the overall magnetic field distribution of the antenna; and a processing device executing instructions associated with an adjustment module, the adjusting module coupled to said primary loop and said secondary loop, said adjustment module varying said secondary current while said primary current is read, and to adjust an amplitude and phase of the secondary current of said secondary loop relative to the primary current of said primary loop to remove imbalances in the overall magnetic field, change the overall magnetic field distribution of the antenna, and ensure the overall magnetic field has a field strength within a predetermined range over the operating volume of the antenna, wherein said varying is performed based on testing and simulation.

2. The antenna of claim 1, wherein said primary loop is rectangular.

3. The antenna of claim 1, wherein said secondary loop is rectangular.

4. The antenna of claim 1, wherein said adjustment module adjusts an amplitude and a phase of said secondary current while monitoring said primary current, said adjustment module utilizing a value obtained from said monitoring to determine the phase and amplitude of said secondary current.

5. The antenna of claim 1, wherein varying said secondary current is based on a value of the primary current.

6. A method for adjusting an overall magnetic field of a near field communications (NFC) antenna for a mobile device, said method comprising:

executing, by a processing device, instructions associated with an adjustment module, reading, by the adjustment module, which is to a primary loop and a secondary loop of said antenna, a primary current in said primary loop, wherein the primary loop has a first magnetic field with an associated magnetic field distribution, such that magnetic field lines associated therewith are configured to be stronger in a center of the primary loop relative to an edge of the primary loop, and wherein said secondary loop is disposed within the magnetic field lines in the center of said primary loop and has a secondary current to produce a second magnetic field to suppress the first magnetic field in the center of the primary loop, and to change an overall magnetic field distribution of the antenna; and performing, by said adjustment module, one or more adjustments to said secondary current while said primary current is read, and to adjust an amplitude and phase of the secondary current of said secondary loop relative to the primary current of said primary loop to remove imbalances in the overall magnetic field distribution, change the overall magnetic field distribution of the antenna, and ensure the overall magnetic field distribution has a field strength within a predetermined range, wherein said one or more adjustments are performed based on said reading of the primary current and simulation.

7. The method of claim 6, wherein said one or more adjustments are performed to remove imbalances in the overall magnetic field distribution caused by a material.

8. The method of claim 6, wherein said one or more adjustments are performed to meet a shape requirement for an operating volume associated with the magnetic field distribution of said NFC antenna.

9. The method of claim 6, wherein said primary current and said secondary current are sinusoidal and have a same frequency.

10. The method of claim 9, wherein said one or more adjustments comprise a first adjustment and a second adjustment, said first adjustment and said second adjustment differing from each other to compensate for one or more changes in one or more operating characteristics of the mobile device.

11. The method of claim 6, wherein performing one or more adjustments to said secondary current is based on a value of the primary current.

* * * * *